Figure 1:
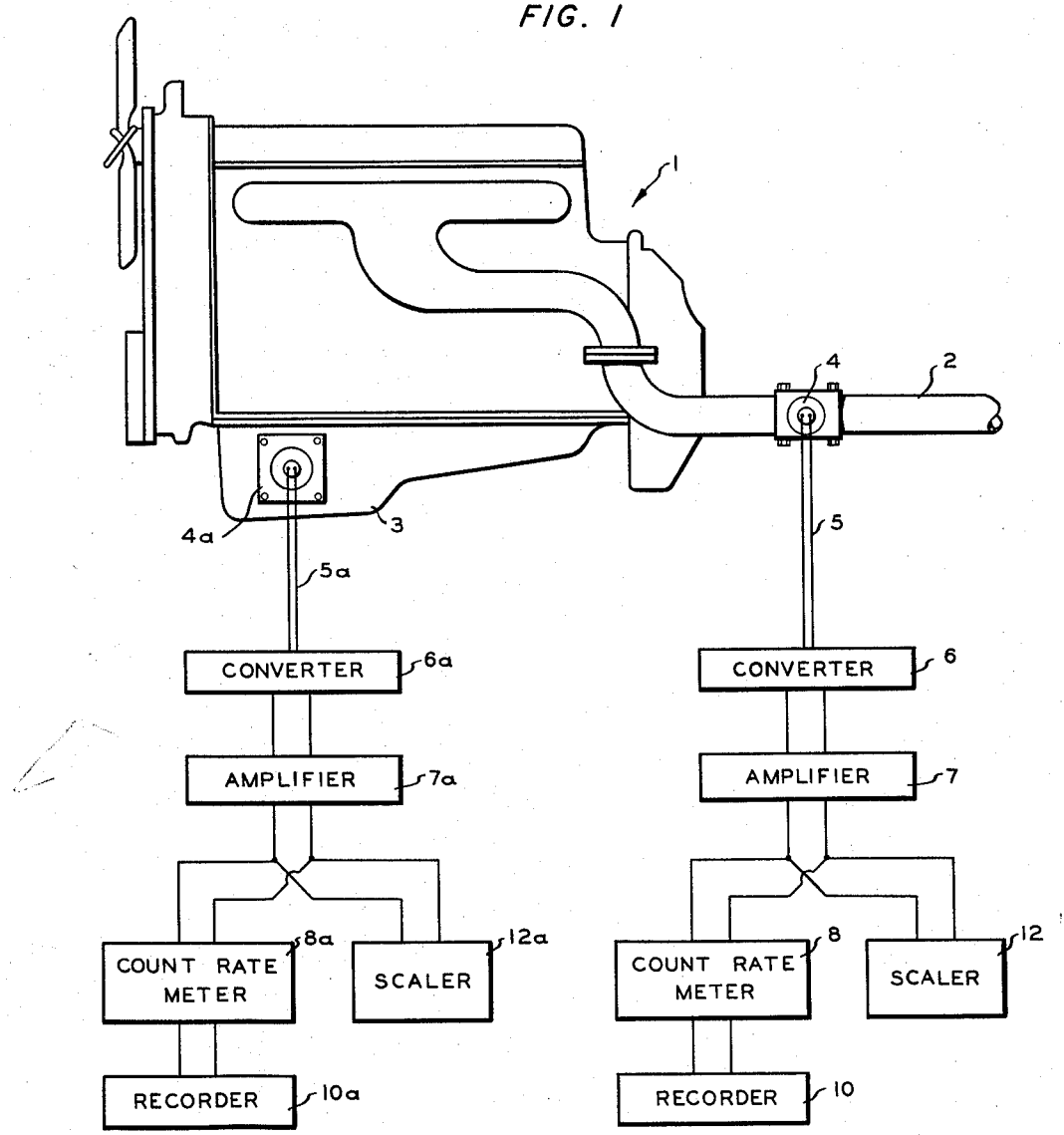

United States Patent Office
2,957,986
Patented Oct. 25, 1960

2,957,986

MEANS OF STUDYING OIL CONSUMPTION IN AN ENGINE

Harold T. Quigg, Bartlesville, Okla., assignor to Phillips Petroleum Company, a corporation of Delaware Filed Apr. 22, 1955, Ser. No. 503,115

10 Claims. (Cl. 250—43.5)

This invention relates to an improved method and means of evaluating the oil consumption in an internal combustion engine by using a radioisotope of one or more fractions of the lube oil and detecting the concentration of said radioisotope in the engine exhaust gas and/or the crankcase oil with suitable radiation detection means.

The phenomenon of radioactivity, i.e., the emission of energy and/or mass from unstable atomic nuclei, has been recognized for more than half a century, but before 1945 the supply of radioactive isotopes in an appreciable concentration was limited to small quantities of some of the naturally occurring heavy metals, such as radium and thorium. The advent of the chain-reacting uranium pile has made possible the production in relatively large quantities of radioisotopes of most of the elements. Accordingly, the chemical industry is now developing new processes and systems which utilize the radiation emitting from radioisotopes in many capacities.

Motor oil consumption is one of the most difficult performance properties to measure with a satisfactory degree of precision because even small changes in engines, operating conditions, and instrument settings can influence the absolute and relative consumption values in comparing a group of oils or engines. The amount or rate of oil consumption in any given engine may depend on a variety of factors. Excessive oil consumption is often caused by mechanical defects in the engine that cannot be effected appreciably by oil, regardless of what oil is used. On the other hand, high oil consumption may come from physical deficiencies in the oil. The properties of motor oils that have the greatest effect on consumption tendencies (volatility, viscosity, and viscosity index) are difficult to isolate and study separately, since they are, to a large extent, interdependent.

The present methods of measuring oil consumption are quantitive, that is, the oil is weighed into the motor before the test begins, the motor is then operated for a given period of time, and the remainder of the oil is then drained from the crankcase and weighed. This requires running tests of many hours duration since the amount of oil used by an engine in a short period of time, say 3 or 4 hours, is too small to be an accurate index of long-range oil consumption. In addition, it is difficult to determine the consumption of any particular component of the oil by such a method; to do this requires comparing a number of samples of varying composition and determining the consumption of any one component by a process of elimination. Another disadvantage to this method is that it is impossible to determine the rate of consumption at any one of the several engine speeds used in any testing cycle. In order to simulate driving conditions in the laboratory it is necessary that the engine be operated at several different speeds over the test period but unless the engine is drained and refilled after each increment of speed there is no way to compare oil consumption at the several speeds in the cycle.

Figure 2:
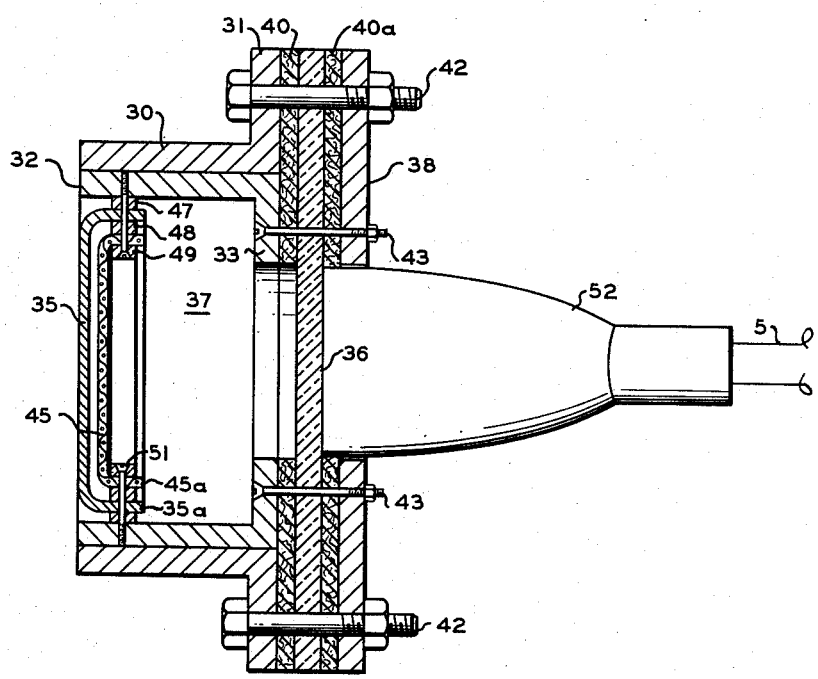

An object of this invention is to provide an improved method and means of measuring oil consumption in internal combustion engines. Another object is to provide a means and method for accurately measuring oil consumption over a short period of motor operation where gravimetric methods are not sufficiently precise. A further object is the use of radioisotopes as tracers in the aforesaid measurement. Other objects, advantages and features of the invention will be apparent to those skilled in the art from the following discussion and drawings in which:

Figure 1 is a schematic diagram illustrating the combination and relative positions of radiation detecting means and an internal combustion engine, and Figure 2 is an elevation, partly in section, of a scintillation detection unit.

In accordance with the present invention, the oil consumption in an internal combustion engine is determined by making the lube oil, or any component thereof, radioactive, and then measuring the radioactivity of the exhaust gases. This measurement is supplemented in certain cases by a simultaneous measurement of the radioactivity of the crankcase oil. The latter measurement, by itself, is useful as a comparison of the consumption rate of various lube components. These determinations require that the molecules representing any lube component under consideration be "tagged," i.e., contain one or more atoms which are radioactive. For most oil consumption studies, carbon-14 is the preferred isotope because all oil components are organic and hence contain carbon as one constituent. Examples of suitable radiation detectors are a scintillation detector and a Geiger-Müller detector. The present invention can be used advantageously to study the effect of any oil fraction or lube additive on oil consumption. It permits measurement of losses so small as to be below the ordinary limits of analysis. A more important advantage, to be discussed later, is the accurate measurement of oil consumption over a short period of time at a given engine speed so as to simulate the actual driving conditions.

Referring to Figure 1, there is shown schematically a conventional internal combustion engine 1 with exhaust pipe 2 and crankcase 3. On exhaust pipe 2 is mounted a radiation detector 4, the output of which is transmitted via leads 5 to converter 6. The output of converter 6 is conducted to an amplifier 7 and a counting ratemeter 8 which counts the rate at which radiations come into detector 4. The output of ratemeter 8 is transmitted to recorder 10. This may be any commercially available strip-chart recorder of either the continuous balance or the direct-reading milliammeter variety and would be calibrated to indicate directly the consumption rate. A scaler 12 is connected in parallel with ratemeter 8 and recorder 10; this unit totalizes all pulses coming from converter 6 and hence indicates how much oil has been consumed. This, too, is calibrated to indicate directly the total oil consumption. A similar detector unit 4a is mounted on crankcase 3 and connected through leads 5a to converter 6a, amplifier 7a, count ratemeter 8a, recorder 10a, and scaler 12a.

Referring now to Figure 2, there is shown in greater detail a scintillation detector unit of the type indicated generally at 4, 4a (Figure 1). A length of conduit 30 is provided with a flange 31, within which is fitted a cylindrical liner 32 having a flange 33 projecting inwardly therefrom and with its outer surface flush with that of flange 31. A thin window 35 across the lage end of liner 32 and a thick glass plate 36 at the small end thereof define a closed chamber 37 which is filled with a scintillation material, liquid or solid, of a type described below. Plate 36 is sandwiched between an annular disk or backplate 38 and flanges 31, 33, and separated therefrom by gaskets 40, 40a so as to insure a pressure-tight seal; a plurality of bolts 42, 43 serve to securely bolt this portion of the assembly together. A circular wire mesh screen 45 serves as a backing or brace for radiation window 35. Both of these elements are bent inwardly at their periphery to form projections 35a, 45a, respectively. These projections are insulated on each side by annular gaskets 47, 48, 49. A plurality of bolts 51 extend through projections 35a, 45a, gaskets 47, 48, 49 and into tapped holes in liner 32 to secure these units together and provide a pressure-tight seal at the front of chamber 37.

Window 35 is designed from the materials and thicknesses of materials known in the art to be transparent to the radiation present in the fluid being scanned. When carbon-14 is the radioactive atom to be detected, window 35 can be a sheet of aluminum whose thickness is not over 4 milligrams/ sq. cm. In measuring beta rays from carbon-14 disintegration, the scintillation materials used in chamber 37 include terphenyl-xylene, terphenyl-dioxane and 2,5-diphenyloxazole-xylene.

A photomultiplier tube 52 is placed adjacent to plate 36 and provides a means for detecting and multiplying scintillations from the scintillation material in chamber 37. Tube 52 is connected through leads 5 to the converter, amplifier, etc., shown in Figure 1 and thereby provides a voltage which is characteristic of the concentration of the radioisotope in the fluid adjacent window 35.

The detector units are secured to the crankcase or exhaust manifold in any manner permitting direct contact between the window 35 and the oil or exhaust gas; one means of mounting such a unit on a pipe is illustrated in Serial No. 464,286, filed October 25, 1954, same assignee. These units operate by receiving beta rays emitted from the radioactive component adjacent the aluminum window of the unit. These rays are absorbed by the scintillation material which, in turn, scintillates or emits flashes of light. These pass through photomultiplier tube 50 containing a photosensitive cathode which emits electrons when the light flashes strike it, thus setting up an electrical current. The remainder of the photomultiplier tube is a current amplifier which amplifies the electrons emitted from the photosensitive cathode. These are transmitted through coaxial cables (to eliminate other electrical pick-up disturbances) and into a resistor; the output from the latter is a voltage pulse. This is then passed through voltage amplifier 7 and counting ratemeter 8 and/or scaler 12 as illustrated in Figure 1.

By coordinating the concentration of the tagged component in the crankcase with the total consumption of tagged component recorded by the scaler on the exhaust line detector, one can calculate the total oil consumed over a given period of time as well as the total weight loss of radioactive material over the same period. Assume, for example, that the scaler on the exhaust line unit records 6 pulsations in a period of 60 seconds and that it has already been determined that each pulsation indicates that one gram of the tagged fraction has been burned. It follows that 6 grams of the tagged fraction has been burned during the 60-second test period. Now, assume that the detector unit on the crankcase indicates that the radioactivity count of the crankcase oil has remained constant during this minute, indicating that all components of the oil are being consumed in the same ratio as their proportion to the whole. Then, if the radioactive component comprises 10% by weight of the oil, it follows that 60 grams of oil have been consumed in the one-minute test period. This consumption rate can then be compared with the value recorded by the counting ratemeter over the same period of time, one minute. The resulting comparison may be used as a check on the operation of the instrument since the two values should agree reasonably well.

In case the radioactivity is distributed evenly throughout the various fractions of the oil there is no point in analyzing at any point other than on the exhaust gas line since the radioactivity of a given volume of oil in the crankcase would remain constant.

In those cases where only one component of the oil is tagged, one can secure a double check by detecting the radiation of both the exhaust gases and the crankcase. In using the crankcase detector 4a it is, of course, necessary that the oil level be sufficient to cover the window 35 of the unit. This gives an accurate determination of the radiation change in a representative volume of the oil in the crankcase. If, e.g., the rate at which radiations come into the ratemeter on the crankcase unit remains constant, it means that the concentration of the tagged component is not changing; hence, all components are being consumed in the ratio which they constitute to the whole. If the rate of radiation decreases in this representative volume, it indicates that the tagged component is being lost from the oil. If the rate of radiation increases, it means that the untagged portion of the oil is being consumed relatively faster than the tagged portion. In short, the crankcase detector unit keeps a constant check on the concentration of the radioactive component of the oil. In the event that it is desired to determine only the relative order in which the various fractions of the lube oil are consumed, the determination of the radioactivity in the crankcase alone is sufficient; the radioactivity of the exhaust need not be determined.

In calibrating the detector the simplest although not the most accurate method is to install a detector unit on the exhaust line, fill the crankcase with oil to a given level, run the engine for any given period of time while counting the total number of pulses on the scaler, stop the engine and then to measure the amount of oil required to refill the crankcase to its original level. This latter volume is, of course, the volume of oil consumed during the test period; the ratio of this volume of oil to the total number of pulses counted during the period in which it was consumed gives the volume of oil consumed per pulse detected. The inaccuracy of this method is in the quantitative refilling of the crankcase to its original level.

A more accurate method is the isotope dilution technique used, for example, in medical research. This requires the installation of a detector unit on both the exhaust line and the crankcase, as shown in Figure 1. In this method the oil is measured into the crankase, the total number of pulse counts recorded on the exhaust line as the engine is operated, and the engine then turned off. At this point the question is how much oil remains in the crankcase. This is determined by adding a given volume of non-radioactive oil to the crankcase and then noting the decrease in the radioactivity count in the crankcase which accompanies this dilution. This decrease in the count will be proportional to the amount of oil added. If, for example, thte radioactivity registered by the detector unit declines by 50% when the new oil is added, it means that the quantity of oil added was equal to the amount remaining in the crankcase when the engine was stopped.

As a practical example of this technique, assume that crankcase 3 (Figure 1) is filled with a measured volume of oil, $V_0$, containing one tagged component, the motor operated for a given period of time, say one hour, and then shut off. During this time the scaler 12 has registered a certain total count of pulses, say 6,000. The construction of the radioactive component at $V_2$, the volume of oil in the crankcase at the time the engine was stopped will be indicated on counting ratemeter 8a; call this value $CR_2$. $V_2$ must now be determined in order to learn the volume of oil which was consumed during the test period. A quantity of new oil, $\Delta V$, is now measured into the cranakcase, this oil being of the same composition as that added originally but non-radioactive. This fills the crankcase to a volume $V_2 + \Delta V$; call this $V_1$. It also dilutes the radioactive component of the total mixture, decreasing the count on ratemeter 8a in proportion to the amount of oil added ΔV. Call this value or count $CR_1$. This enables $V_2$ to be computed by this formula:

$$\frac{V_2}{V_2+\Delta V}=\frac{CR_1}{CR_2}$$

Hence, $$V_2=\frac{CR_1\Delta V}{CR_2-CR_1}$$

With $V_2$ known it is a matter of mere subtraction $(V_0-V_2)$ to calculate the volume of oil consumed over the test period. Comparing this with the count on scaler 12 gives the relation between the total pulses detected in the exhaust gas and the volume of oil which produced these pulses. If, for example, $V_0-V_2=1$ quart and the count on scaler 12 was 6,000, as assumed above, it is evident that in testing the consumption of this oil each pulse detected in the exhaust stream is equal to $$\frac{1}{6,000}$$

of a quart of oil consumed.

The components of the oil to be made radioactive may be synthesized from carbon-14. Irradiation of the oil by presently available methods, as by using an atomic pile, is not a practical alternative to synthesis from carbon-14 due to the drastic changes imparted to the entire hydrocarbon structure.

If the rate of oil consumption is insufficient to give a measurable value on the exhaust line detector, another expedient can be resorted to. The exhaust gases can be passed into an absorbent to precipitate the $CO_2$ content thereof, for example, the gases could be absorbed in barium hydroxide wherein the $CO_2$ would be precipitated as barium carbonate. The precipitate thus obtained over a measured period of time can then be thermally decomposed to expel the $CO_2$ content thereof and this gas stream can be scanned in the manner already described so as to detect the percent of carbon-14 therein. From this one can compute the consumption rate and weight of the radioactive component over the period of time during which the $CO_2$ was collected as a precipitate.

The foregoing specification should be considered as illustrative of the invention, not limiting, since certain modifications could be made by those skilled in the art without departing from the spirit of the invention.

I claim:

1. A method of measuring oil consumption in an internal combustion engine which comprises placing oil containing at least one radioactive component in the crankcase of said engine, operating said engine thereby producing exhaust gases which include combustion products of any oil consumed, and sensing the radioactivity of said exhaust gases, said radioactivity being correlative to said oil consumed.

2. A method of measuring oil consumption in an internal combustion engine under various operating conditions which comprises placing a first known quantity of oil containing at least one radioactive component in the crankcase of said engine, operating said engine for a first time period thereby producing exhaust gases which include combustion products of any oil consumed and leaving a second quantity of oil remaining in said crankcase, sensing the radioactivity of said exhaust gases, measuring the difference between said first and second quantities of oil thereby establishing a correlation between said radioactivity and said oil consumed, operating said engine for a second period producing additional exhaust gases, and sensing radioactivity of said additional exhaust gases.

3. A method according to claim 2 wherein said measuring the difference between said first and second quantities of oil comprises making physical volume measurements on said first and second quantities.

4. A method according to claim 2 wherein said measuring the difference between said first and second quantities of oil comprises adding a known quantity of non-radioactive oil to said crankcase and sensing the resulting decrease in radioactivity of a constant volume of oil in said crankcase.

5. A method of determining the comparative rate of consumption of one component of an oil in an internal combustion engine which comprises placing oil containing only one radioactive component in the crankcase of said engine, sensing the radioactivity of a constant volume of oil in said crankcase, operating said engine, and sensing the change in radioactivity of said constant volume of oil over a given time period, the rate of said change in radioactivity being correlative to said comparative rate of consumption of said radioactive component.

6. A method of measuring the consumption of one component of an oil in an internal combustion engine which comprises placing oil containing only one radioactive component in the crankcase of said engine, sensing the radioactivity of a constant volume of oil in said crankcase, operating said engine thereby producing exhaust gases which include combustion products of any oil consumed, sensing the radioactivity of said exhaust gases, and sensing the change in radioactivity of said constant volume of oil, said radioactivity of exhaust gases and said change in radioactivity being correlative to the consumption of said component.

7. A method according to claim 6 wherein the radioactive component is a hydrocarbon having molecules containing carbon-14.

8. A method according to claim 7 wherein $CO_2$ is present in said exhaust gases and the radioactivity of said exhaust gases is sensed by precipitating said $CO_2$ by forming a carbonate, decomposing said carbonate to expel said $CO_2$, and sensing the radioactivity of said $CO_2$.

9. Apparatus for determining the consumption of an oil having a radioactive component in an internal combustion engine comprising, in combination, an internal combustion engine having a crankcase and an exhaust pipe, a first radiation detection means adjacent said exhaust pipe and arranged to sense radioactivity in gases passing through said pipe, a second radiation detection means adjacent said crankcase and arranged to sense radioactivity of a constant volume of oil in said crankcase, and means associated with said first and second radiation detection means for indicating radiation values sensed.

10. Apparatus for determining the consumption of an oil having a radioactive component in an internal combustion engine comprising, in combination, an internal combustion engine having a crankcase and an exhaust pipe, a first radiation detection means adjacent said exhaust pipe and arranged to sense radioactivity in gases passing through said pipe, a second radiation detection means adjacent said crankcase and arranged to sense radioactivity of a constant volume of oil in said crankcase, said first and second radiation detecting means each comprising a liquid which emits a flash of light for every beta particle it absorbs and a photosensitive cathode positioned to receive said light flashes and to emit a pulse of electrons for every flash received, said pulse of electrons thus forming an electrical current, means for amplifying the current from each of said detection means, and means for counting the pulses of each amplified current, the count being an index of the radioactivity of the material being sampled by said first and second detection means.

References Cited in the file of this patent

UNITED STATES PATENTS 1,808,709    Blake  ------------------  June 2, 1931

(Other references on following page)

UNITED STATES PATENTS

| | | | |
|---|---|---|---|
| 2,315,845 | Ferris | Apr. 6, | 1943 |
| 2,453,456 | Piety | Nov. 9, | 1948 |
| 2,534,352 | Herzog | Dec. 19, | 1950 |
| 2,588,210 | Crisman | Mar. 4, | 1952 |
| 2,631,242 | Metcalf | Mar. 10, | 1953 |
| 2,640,788 | Rockett | June 2, | 1953 |
| 2,660,678 | Sigworth | Nov. 24, | 1953 |
| 2,675,478 | Brunton | Apr. 13, | 1954 |
| 2,768,307 | Tirico | Oct. 23, | 1956 |

OTHER REFERENCES

"Radioactive Isotopes as Tracers," Kramer, Power Plant Engineering, November 1947, pages 105–109.

"Using Radioactivity in the Refinery," Gester et al., Petroleum Processing, April 1953, pages 550–553.

"Radioisotopes in Industry," Bradford, Reinhold Publishing Corp., 330 W. 42nd Street, New York, N.Y., pp. 25, 26 and 76.

Hull: "Using Tracers in Refinery Control," article in Nucleonics; vol. 13, April 1955; received April 13, 1955.